United States Patent
Grover et al.

(10) Patent No.: US 11,751,033 B2
(45) Date of Patent: Sep. 5, 2023

(54) METHOD FOR OUT-OF-THE-BOX PAIRING FOR UNASSOCIATED WIRELESS DEVICES

(71) Applicant: Plantronics, Inc., Santa Cruz, CA (US)

(72) Inventors: Jonathan Grover, San Jose, CA (US); Scott Walsh, Foxham (GB); Wilson Ching-Lun Chung, Menlo Park, CA (US)

(73) Assignee: Plantronics, Inc., Santa Cruz, CA (US)

( * ) Notice: Subject to any disclaimer, the term of this patent is extended or adjusted under 35 U.S.C. 154(b) by 137 days.

(21) Appl. No.: 17/141,892

(22) Filed: Jan. 5, 2021

(65) Prior Publication Data
US 2022/0217516 A1 Jul. 7, 2022

(51) Int. Cl.
*H04W 4/80* (2018.01)
*H04W 8/00* (2009.01)
*H04W 76/14* (2018.01)
*H04W 12/50* (2021.01)

(52) U.S. Cl.
CPC ............. *H04W 4/80* (2018.02); *H04W 8/005* (2013.01); *H04W 12/50* (2021.01); *H04W 76/14* (2018.02)

(58) Field of Classification Search
CPC ....... H04W 4/80; H04W 76/14; H04W 12/50; H04W 8/005
USPC ...................................................... 455/41.2
See application file for complete search history.

(56) References Cited

U.S. PATENT DOCUMENTS

| | | | | |
|---|---|---|---|---|
| 6,961,541 | B2* | 11/2005 | Overy | H04L 67/52 713/168 |
| 8,472,874 | B2* | 6/2013 | Tang | H04W 12/50 370/313 |
| 2010/0306335 | A1* | 12/2010 | Rios | H04W 8/005 709/211 |
| 2012/0135683 | A1* | 5/2012 | Lee | H04W 8/005 455/41.2 |
| 2012/0322376 | A1* | 12/2012 | Couse | H04M 1/72412 455/41.2 |
| 2015/0024688 | A1* | 1/2015 | Hrabak | H04W 4/80 455/41.2 |
| 2015/0249913 | A1* | 9/2015 | Hua | H04W 12/50 455/41.2 |
| 2015/0351143 | A1* | 12/2015 | Seymour | H04R 25/554 455/41.2 |
| 2016/0095145 | A1* | 3/2016 | Gupta | H04W 8/005 455/41.2 |
| 2019/0174293 | A1* | 6/2019 | Kerr | H04L 41/12 |
| 2020/0382569 | A1* | 12/2020 | Fornshell | H04L 65/611 |

* cited by examiner

*Primary Examiner* — April G Gonzales
(74) *Attorney, Agent, or Firm* — Quarles & Brady LLP

(57) ABSTRACT

An apparatus includes a network circuit to communicate with a network and a server on the network. The apparatus includes a wireless circuit to communicate with another wireless device. The apparatus includes control logic to determine that the other wireless device is within a given proximity of the apparatus, and to determine that the other wireless device is configured to perform automatic pairing. The control logic is further to, based on a determination that the other wireless device is within the given proximity of the apparatus and is configured to perform automatic pairing, access the server to determine whether to perform automatic pairing with the other wireless device. The control logic is to pair with the other wireless device without further input from a user of the apparatus.

16 Claims, 5 Drawing Sheets

METHOD FOR OUT-OF-THE-BOX PAIRING FOR UNASSOCIATED WIRELESS DEVICES

FIELD OF THE INVENTION

The present disclosure relates to providing wireless device pairing and, more particularly, to a method for out-of-the-box pairing for unassociated wireless devices.

BACKGROUND

Using various wireless protocols such as Bluetooth, Zigbee, Z-wave, Wi-Fi HaLow/IEEE802.11ah, devices may be paired wirelessly so that the devices might communicate with each other. For example, Bluetooth devices may be provided by a maker or seller with a Bluetooth receiver or dongle that may be paired with the device. However, such a receiver or dongle might be compatible with other Bluetooth devices that were not provided at the same time by the maker or seller of the Bluetooth receiver or dongle. Pairing wireless devices that were not manufactured together, or configured together before distribution to an end user, may require user intervention to pair the devices. The initial experience of a user who uses wireless devices after purchasing or receiving new devices may be referred to as an out-of-the box experience.

Typically, wireless devices that will be provided to an end user wherein the wireless devices are already paired in an out-of-the-box experience are so-paired while the wireless devices are manufactured or packaged together. However, such a pairing scheme does not facilitate pairing of devices that come from different manufacturers, factories, distribution centers, or that are purchased at different times or places. Embodiments of the present disclosure address one or more of these challenges identified by the inventors.

SUMMARY

Embodiments of the present disclosure include a first apparatus. The first apparatus may include a network circuit, a wireless circuit, and control logic. The network circuit may be configured to communicatively couple the first apparatus to a network and a server on the network. The wireless circuit may be configured to communicatively couple the first apparatus to another wireless device, wherein the first apparatus and the other wireless device are to exchange application data after being paired. The control logic may be configured to determine that the other wireless device is within a given proximity of the first apparatus. The control logic may be further configured to determine that the other wireless device is configured to perform automatic pairing. The control logic may be further configured to, based on a determination that the other wireless device is within the given proximity of the first apparatus and is configured to perform automatic pairing, access the server to determine whether to perform automatic pairing with the other wireless device. The control logic may be further configured to, based on a determination that automatic pairing is to be performed with the other wireless device, pair with the other wireless device without further input from a user of the first apparatus.

Embodiments of the present disclosure may include a second apparatus. The second apparatus may include a wireless circuit and control logic. The wireless circuit may be configured to couple the second apparatus to another wireless device, wherein the second apparatus and the other wireless device are to exchange application data after being paired. The control logic may be configured to determine that the other wireless device is within a given proximity of the second apparatus. The control logic may be further configured to determine that the other wireless device is configured to perform automatic pairing. The control logic may be further configured to, based on a determination that the other wireless device is within the given proximity of the second apparatus and is configured to perform automatic pairing, access the server through the other wireless device to determine whether to perform automatic pairing with the other wireless device. The control logic may be further configured to, based on a determination that automatic pairing is to be performed with the other wireless device, pair with the other wireless device without further input from a user of the second apparatus.

Embodiments of the present disclosure may include a system. The system may include instances of the first apparatus and of the second apparatus from any of the above embodiments. For instances of the first apparatus, instances of the second apparatus may implement the other wireless device thereof. For instances of the second apparatus, instances of the first apparatus may implement the other wireless device thereof.

Embodiments of the present disclosure may include methods performed by any of the apparatuses or systems of the above embodiments.

Embodiments of the present disclosure may include an article of manufacture. The article of manufacture may include a non-transitory medium. The medium may include instructions. The instructions, when loaded and executed by a processor, may cause the processor to perform any of the methods or configurations of any of the apparatuses or systems of the above embodiments.

DETAILED DESCRIPTION

Figure 1:
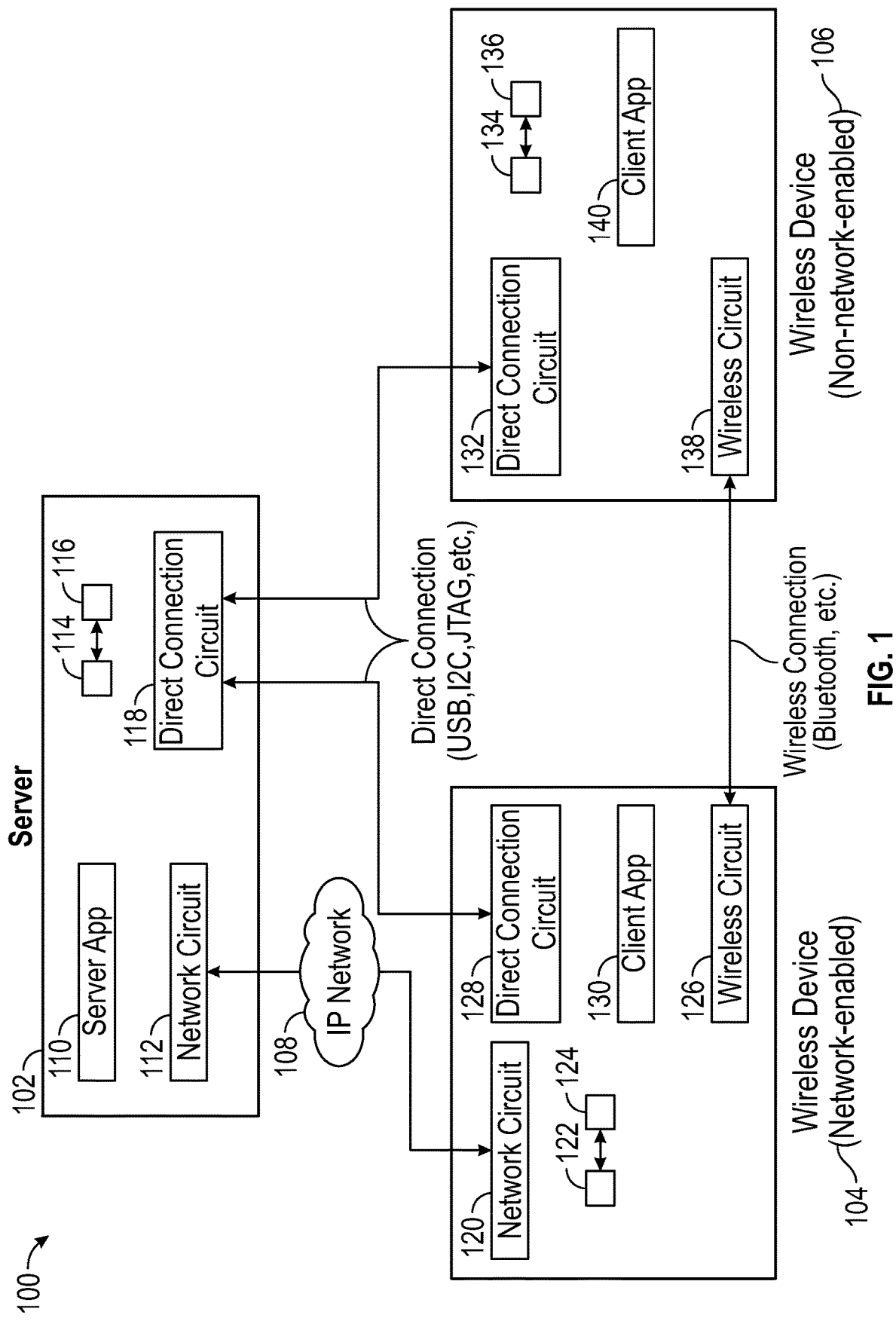
FIG. 1 is an illustration of an example system for out-of-the-box pairing for unassociated wireless devices, according to embodiments of the preset disclosure.

FIG. 1 is an illustration of an example system 100 for out-of-the-box pairing for unassociated wireless devices, according to embodiments of the preset disclosure. System 100 illustrates example elements and example connections between these elements that may occur in a variety of system instances. For example, system 100 may include a server 102 and two or more wireless devices, such as device 104 and device 106. Instances of system 100 may include any suitable number or combination of server 102 and devices 104, 106.

Server 102 may include a server within any suitable context, such as in manufacturing, supply chain or distribution, a point of sale (POS), or a cloud server accessible to other instances of server 102 and wireless devices via a network. These contexts may include manufacturing, supply chain or distribution, or POS for devices such as devices 104, 106.

Devices 104, 106 may be implemented as any suitable wireless or Bluetooth devices, such as dongles, headsets, peripheral devices such as mice or keyboards, computers, laptops, smartphones, or automotive head units. Devices 104, 106 may be configured to be paired with each other. Devices 104, 106 may be implemented according to, for example, the Bluetooth standard or any other suitable wireless protocol.

Server 102 may be configured to provision devices 104, 106 with any suitable information, such as pairing information or other settings for wireless operation. Moreover, server 102 may be configured to receive any suitable information from devices 104, 106, such as unique identifiers of devices 104, 106 or other suitable information. The unique identifier may be implemented as a serial number, MAC address, or any other suitable identifier. The unique identifier and other information may be accessed by a direct connection, network connection, scanner, camera, near-field communication (NFC) tag, smart tags, QR codes, bar codes, or any other suitable process. The unique identifier and other information may be accessed through memory, fuses, packaging, or any other suitable mechanism of the respective device. When read, the unique identifier and other information may be transformed, hashed, or encrypted. The unique identifier and other information may include, for example, a serial number for a respective device 104, 106, and a unique identifier of a Bluetooth radio, such as a MAC address, or another MAC address. The serial number might be available, for example, on packaging of the device. The MAC address might be available, for example, in software or firmware layers. The unique identifier may include further identifiers that are separate from the serial number and the MAC address.

Device 104 may include a wireless device that includes components that enable device 104 to access server 102 over a network, such as IP network 108. In contrast, device 104 may include a wireless device that cannot access server 102 over a network, because device 104 does not include the requisite equipment, components, processing power, or other mechanisms, or because such requisite mechanisms are turned off or unused.

Device 104 and device 106 may be configured to be paired with one another. Furthermore, each of device 104 and device 106 may be configured to be paired with any other suitable instance of device 104 or device 106. In one embodiment, provisioning device 104 or device 106 to be paired together in an out-of-the-box experience for an end user may be performed by server 102. Provisioning may be made by server 102 accessing device 104 or device 106. Such access may be made by a network connection, such as through IP network 108. Furthermore, such access may be made by a direct connection, such as universal serial bus (USB), I2C, JTAG, or by the wireless protocol (such as Bluetooth) itself. A direct connection may be made in certain situations, such as when the respective device is in physical proximity to server 102. However, such physical proximity might not be possible, such as when devices 104, 106 are opened by an end user. In such a case, as discussed above, server 102 might be accessed by device 104 through IP network 108. However, as discussed above, device 106 might be unable to access networks such as IP network 108. In one embodiment, in such a scenario, device 106 may be configured to access server 102 for provisioning through device 104, which may handle the network access on behalf of device 106. Such an arrangement may be made before device 104 and device 106 are fully paired through the wireless protocol. Such a connection via a wireless protocol between device 104 and device 106, but before device 104 and device 106 are fully paired and in order to complete such a pairing, may be referred to as "pairing lite".

Server 102 may include any suitable number and kind of components. Server 102 may include a processor 114 communicatively coupled to a memory 116. Memory 116 may include instructions that, when loaded and executed by processor 114, perform the configured operations of server 102 as described herein. For example, server 102 may include a server app 110. Server app 110 may be configured to record, track, update, or otherwise manage information about devices 104, 106 and users thereof. Server app 110 may be configured to access any suitable information repository such as databases in or communicatively coupled to server 102 to perform such information management. Moreover, server 102 may be configured to provision devices 104, 106 with pairing information. Such pairing information may enable devices 104, 106 to pair with each other. Server 102 may be configured to receive information about devices 104, 106 such as unique identifiers of devices 104, 106 or user information associated with devices 104, 106.

Server 102 may be configured to directly access devices 104, 106 through a direct connection circuit 118. Direct connection circuit 118 may be configured to provide communication to devices 104, 106 through any suitable protocol, such as USB, I2C, or JTAG. Furthermore server 102 may be configured to access devices 104, 106 through a network circuit 112, enabling communication through, for example, IP network 108. Circuits 112, 118 may be implemented by analog circuitry, digital circuitry, instructions for execution by a processor, or any suitable combination thereof.

Device 104 may include any suitable number and kind of components. Device 104 may include a processor 122 communicatively coupled to a memory 124. Memory 124 may include instructions that, when loaded and executed by processor 122, perform the configured operations of device 104 as described herein. For example, device 104 may include a client app 130. Client app 130 may be configured to communicate with server app 110 to manage information about device 104 or device 106, or to receive pairing information. Device 104 may include a direct connection circuit 128 to communicate with server 102 through direct connection circuit 118 through any suitable protocol, such as USB, I2C, or JTAG. Furthermore, device 104 may be configured to access server 102 through a network circuit 120, enabling communication through, for example, IP network 108. Furthermore, client 102 may include a wireless circuit 126 configured to perform wireless communication, as well as "pairing lite" operations, with device 106. Circuits 120, 126, 128 may be implemented by analog circuitry, digital circuitry, instructions for execution by a processor, or any suitable combination thereof.

Device 106 may include any suitable number and kind of components. Device 106 may be implemented with components that are the same or similar as device 104, such as a processor 134, memory 136, direct connection circuit 132, wireless circuit 138, and client app 140. However, device 106 might not have a component such as a network circuit for communicating over IP network 108, or such a network circuit may be unavailable or unused.

At manufacture, device 104 and device 106 might be unassociated, wherein the devices are not paired, connected, and might have no knowledge of one another. Each of device 104 and device 106 may be initially provisioned by a different instance of server 102 corresponding to their place of manufacture. Devices 104, 106 might be unassociated because each are made in different manufacturing facilities, or at different times. In one embodiment, instances of system 100 may enable devices 104, 106 to become associated with each other in terms of system information in downstream instances of server 102, such as in a supply chain or distribution server, or in a POS server, or in a cloud server. Thus, when a user turns on devices 104, 106, devices 104, 106 might be securely paired automatically in an out-of-the-box experience without any further action.

Information from devices 104, 106 such as the serial number, MAC address, or other identifier on packaging may be mapped together and stored on a given instance of server 102 such that later access of a server 102 with any such information may be used to fully identify the device. This may be performed on any suitable instance of server 102, such as at manufacture, in the supply chain, at the POS, or by an end user. Instances of server 102 may be configured to securely communicate such information with one another. Moreover, once two instances of device 104 or device 106 are determined to be associated with each other, the associated device may be discoverable by an instance of server 102 by accessing an identifier of the original device. This may be performed using direct communication between servers 102, or by use of centralized servers 102 such as a cloud server.

Figure 2:
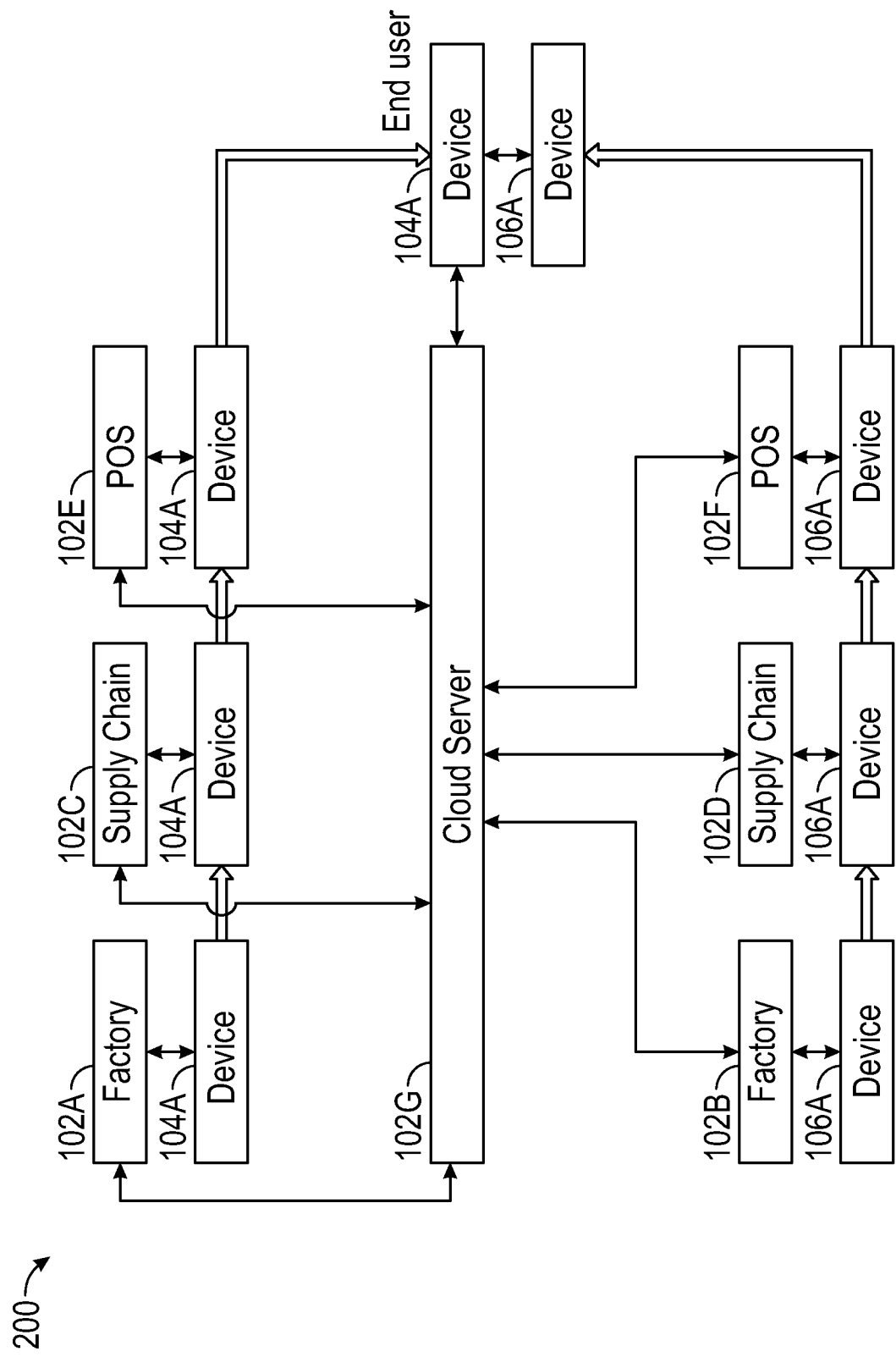
FIG. 2 is an illustration of an example system including various example instances of components from the system of FIG. 1, according to embodiments of the present disclosure.

FIG. 2 is an illustration of an example system 200 including various example instances of components from system 100, according to embodiments of the present disclosure. System 200 may include one or more factories, which may include a factory with a server 102A and another factory with a server 102B. The factory with server 102A may produce a device 104A, and the factory with server 102B may produce a device 106A. Although two factories are illustrated, a single factory may produce both devices 104A, 106A. Moreover, although an instance each of devices 104, 106 are shown as examples, any suitable number and kind of devices may be used in system 100. For example, two instances of device 104 might be used.

Upon creation, validation, testing, or other access of devices 104A, 106A, unique identifiers for each may be read from devices 104A, 106A by respective servers 102A, 102B. The unique identifiers, along with model information, compatible devices, or any other suitable information may be stored in respective servers 102A, 102B. Moreover, such information may be provided to another server, such as a cloud server 102G. After creation of devices 104A, 106A, these devices 104A, 106A and their respective identifiers and information might be unassociated with each other. However, devices 104A, 106A might be caused to be associated with each other at a later point in system 200 such that, when devices 104A, 106A are put within proximity of each other by a user, they may be automatically paired.

As discussed above, in some implementation devices 104A, 106A might be manufactured together or at a similar time at a same factory. In such a case, if devices 104A, 106A are to be packaged or sold together, an instance of device 104 and of 106A might be pre-paired with each other. However, embodiments of the present disclosure provide automatic pairing for use cases wherein devices 104A, 106A are not manufactured together, either in separate factories or at different times, and thus cannot be associated with one another. Embodiments of the present disclosure also provide automatic pairing for use cases wherein devices 104A, 106A might be manufactured at the same factory or at the same time but are typically sold separately, as devices 104A, 106A may be used with a variety of other wireless devices. In order to provide automatic pairing for an end user, information from device 104A may be associated with device 106A at a point later in system 200. Any suitable information may be used to associate devices 104A, 106A, such as user information, preferences, or user settings as discussed in further detail below.

Servers 102A, 102B may utilize cloud server 102G for orchestrating an intended pairing relationship, defined by associated devices 104A, 106A at some point during the operation of system 200. The pairing relationship may be performed automatically and securely after turning on the devices without any subsequent prompting of or further action by an end user. At manufacture, cloud 102G may receive sufficient information to facilitate this orchestration. This may include device information and communication information. As discussed above, device communication may include information uniquely identifying the devices, such as a serial number for a headset implemented by device 106A or a MAC address for a Bluetooth radio implemented by device 104A. Furthermore, the information may include identifiers for the respective device printed on the device itself or product packaging. Such identifiers may be the same or different than other identifiers such as the MAC address or serial number. Communication information may include information used to ensure that the respective device can securely communicate with cloud server 102G, including making data requests of cloud server 102G and receiving data back. Communication between the elements of system 200 may be encrypted. This may be implemented, for example, with a public/private key approach. Devices 104A, 106A may keep their own private key provisioned during the manufacturing or supply chain process, as well as a copy of the public key for cloud server 102G or other suitable servers. Furthermore, cloud server 102G, or other suitable servers, would store its own private key as well as the public keys assigned to devices 104A, 106A. The communication information may further include data such as an IP address or an endpoint permanent link, wherein devices 104A, 106A may use the information to send messages to cloud server 102G for later provisioning and authentication.

After manufacture, device 104A may be provided to a supply chain or distributor. Such a supply chain or distributor entity may have a supply chain server 102C. Moreover, after manufacture, device 106A may be provided to a supply chain or distributor. Such a supply chain or distributor entity may have a supply chain server 102D. If devices 104A, 106A are provided to different supply chain or distributor entities, the association between devices 104A, 106A might not be made at this stage of system 200. However, if devices 104A, 106A are provided to a same supply chain or distributor entity, then devices 104A, 106A might be associated at such a supply chain or distributor entity. Furthermore, if servers 102C, 102D are in communication with each other through, for example, cloud server 102G, then devices 104A, 106A might be associated at such a supply chain or distributor entity stage.

For example, server 102C may be configured to access device 104A through any suitable process, such as directly, by scanning, or by a network. Similarly, server 102D may be configured to access device 106A through any suitable process, such as directly or by scanning. If devices 104A, 106A are at a same server, the server would access both devices.

Similarly, after traversing the supply chain and distributors, devices 104A, 106A may arrive at one or more POSs. Such POSs may have respective servers 102E, 102F. If devices 104A, 106A are provided to different POS entities, the association between devices 104A, 106A might not be made at this stage of system 200. However, if devices 104A, 106A are provided to a same POS entity, then devices 104A, 106A might be associated at such a POS. Furthermore, if servers 102E, 102F are in communication with each other through, for example, cloud server 102G, then devices 104A, 106A might be associated at such a POS stage. Servers 102E, 102F may be configured to access devices 104A, devices 106A, through a suitable process.

Devices 104A, 106A may be associated with one another in a suitable server 102 at any suitable stage of the supply chain or POS, such as by servers 102C, 102D, 102E, 102F. The association may be stored in cloud server 102G. An action may be taken to define an association between devices 104A, 106A, which may be used to later perform secure and automatic pairing. While an association of two devices 104A, 106A in a 1:1 manner is presented as an example, system 200 may be configured to associate devices on a 1:N basis, wherein a given device 106A, such as a headset, may be associated with a dongle 104A, and also, for example, with a phone 104B (not shown) or a video camera 104C (not shown).

Any suitable process may be used to associate devices 104A, 106A. For example, devices may be scanned using QRs, NFCs, or smart tags in fulfilment of an order including both of devices 104A, 106A. Moreover, a user may later designate the association of devices 104A, 106A, discussed in further detail below. Any association information may be collected by a suitable server and stored, for example, in cloud server 102G.

After a sale, devices 104A, 106A may arrive at a user site. End users or administrators may be able to access servers, such as server 102G, to associate devices 104A, 106A if this has not yet been performed. Moreover, such end users or administrators may be able to access such servers even before devices 104A, 106A arrive to associate the devices together. Moreover, upon activating device 106A, it may be automatically provisioned and then paired with device 104A. The automatic pairing of devices 104A, 106A may depend upon a previous association of the devices together.

If devices 104A, 106A are at different entities, or if they are not linkable across different entities, then at this stage devices 104A, 106A might continue to not be associated at such a supply chain or distributor entity. However, if devices 104A, 106A are at the same entity, such as server 102C or server 102D, or if devices 104A, 106A are linkable from different servers 102C, 102D, then at this stage devices 104A, 106A may be associated with one another and provisioned for automatic pairing. Such an association may be driven by a request from a user, purchaser organization, seller, or other downstream entity. For example, if an end user, seller, purchaser, or other entity requests both devices 104A, 106A, there may be an option to request these devices as a pair, wherein they are intended to be used together. This option may be presented to downstream entities upon the request for devices 104A, 106A, or may be selected by default.

For example, a server 102 may receive an order for both devices 104A, 106A to the same seller, user, or organization. In one embodiment, server 102 may determine, based on a determination that both devices 104A, 106A are within the same request, and from a mapping of model numbers of devices 104A, 106A, that devices 104A, 106A are to be associated with one another by default. In another embodiment, server 102 may, from a determination that both devices 104A, 106A are within the same request and from the mapping of model numbers of devices 104A, 106A, provide an option to the requestor of devices 104A, 106A to associate devices 104A, 106A together. This may be useful, for example, wherein devices 104A, 106A can be associated with many different kinds of other devices. In yet another embodiment, the requestor of devices 104A, 106A may proactively request that devices 104A, 106A by associated together. In still yet another embodiment, one of devices 104A, 106A might already be possessed by the requestor, and the request may be for the other of devices 104A, 106A. In such a case, server 102 may provide an association option or make a default association based upon a comparison of the device of the request and the already-installed based on devices.

For example, a user may already have device 104A. This may be known to a server 102 through user-provided information, previous sales, or other sources of information. The user may then purchase device 106A. Server 102 may recognize that device 104A and 106A could be paired together, or are otherwise typically used together. Server 102 may then associate devices 104A, 106A together, or may query the user if devices 104A, 106A are to be paired together. In another example, a user may access server 102G and view all devices assigned to the user, add additional devices, or perform other tasks. The user may select devices 104A, 106A for association. Once devices 104A, 106A have been associated, devices 104A, 106A may be automatically paired.

Automatic pairing may be performed in any suitable manner. For example, a user may unbox and turn on devices 104A, 106A. In another example, one or both of devices 104A, 106A might have already been unboxed and used. In any case, devices 104A, 106A may be turned on and placed within sufficient proximity with one another to perform wireless communication.

Device 104A, upon being activated, may connect via a network to server 102G and determine whether device 104A is to be automatically paired to any other device. The other device may be defined by any suitable identifier, such as a unique identifier like a serial number or MAC address, or a model number. Thus, subsequently, if device 104A comes into wireless contact with such another device, they may automatically pair with one another without user intervention.

However, as discussed above, device 106A might not have the ability to connect via a network to cloud server 102G. Thus, the ability to perform automatic pairing in the same manner as device 102A may be limited. In one embodiment, in order to perform automatic pairing, devices 104A, 106A may first perform "pairing lite", wherein a preliminary recognition of each other is performed so that server 102G may be accessed to determine whether devices 104A, 106A are associated with one another. In a "pairing lite" connection, devices 104A, 106A might not yet have determined if they are actually intended to be automatically paired. Furthermore, in a "pairing lite" connection, the bonding process wherein long-term keys or other authentication mechanisms are exchanged for the devices to communicate general application data, even after restarting and without further pairing operations, has not been completed. Capabilities for performing "pairing lite" may be communicated in any suitable manner, such as with data communicated as part of a Bluetooth feature exchange, I/O capabilities, use of otherwise unused bonding flags. The connection is thus limited to exchanging data that is needed to request data from cloud server 102G to determine whether they are to be automatically paired. Devices 104A, 106A might otherwise have no a priori knowledge about the other device, but the assumption of being in close proximity is an accepted event trigger to access cloud server 102G to make such a determination of automatic pairing.

Device 104A and device 106A may be both turned on and placed within wireless range of one another. Devices 104A, 106A may recognize the existence of each other through standard wireless discovery methods and protocols. However, rather than prompting a user for information so that devices 104A, 106A may be paired, devices 104A, 106A may attempt to automatically pair with one another.

First, devices 104A, 106A may determine whether the devices were previously paired with one another, and, if so, renew such a pairing.

Second, devices 104A, 106A may each determine whether it has been provisioned to be automatically paired with the other device. Such a provisioning may have been provided by any suitable server 102, such as cloud server 102G, in system 200 during the process of providing the device. The provisioning may be implemented by settings or other information stored on the respective device. Such settings or other information may identify the other device by, for example, a unique identifier or a model number. The provisioning may arise from previously associating devices 104A, 106A in system 200. If devices 104A, 106A recognize each other as a device to be paired with based on provisioning, the devices may be paired without further intervention from the user. In some embodiments, a given one of devices 104A, 106A may be configured to automatically pair with any of another device that corresponds to a given model number. In yet other embodiments, a given one of devices 104A, 106A may be configured to automatically pair with only another device that is uniquely identified by, for example, a serial number or MAC address. Cloud server 102G may include an association, mapping, or other knowledge previously defined that defines whether devices 104A, 106A are to be automatically paired.

Third, devices 104A, 106A may access server 102G to obtain any provisioning or other information that may be used for automatic pairing. Device 104A may access server 102G through a network connection. However, device 106A might not have access to a network so as to access server 102G. For example, device 104A might be a dongle on a computer, while device 106A may be a headset. In one embodiment, provisioning of device 106A may be performed by use of the network connection available in device 104A.

The use of the network connection of device 104A to determine provisioning of device 106A may be performed in any suitable manner. In one embodiment, device 104A may make a request of server 102G on behalf of device 106A. Upon recognition of each other through the wireless discovery process, device 106A may recognize that device 104A is configured to provide such capability, based on, for example, a model number of device 104A. Device 106A may be configured to provide its unique identifier or other information to device 104A. Device 104A may provide this information to server 102G, which may respond with any provisioning information based upon any association in servers 102 of device 106A and other devices. Thereafter, device 104A may provide the provisioning information to device 106A. Using this provisioning information, if devices 104A, 106A recognize each other as a device to be paired with based on provisioning, the devices may be paired without further intervention from the user. Otherwise, a user of devices 104A, 106A may manually pair the devices.

Figure 3:
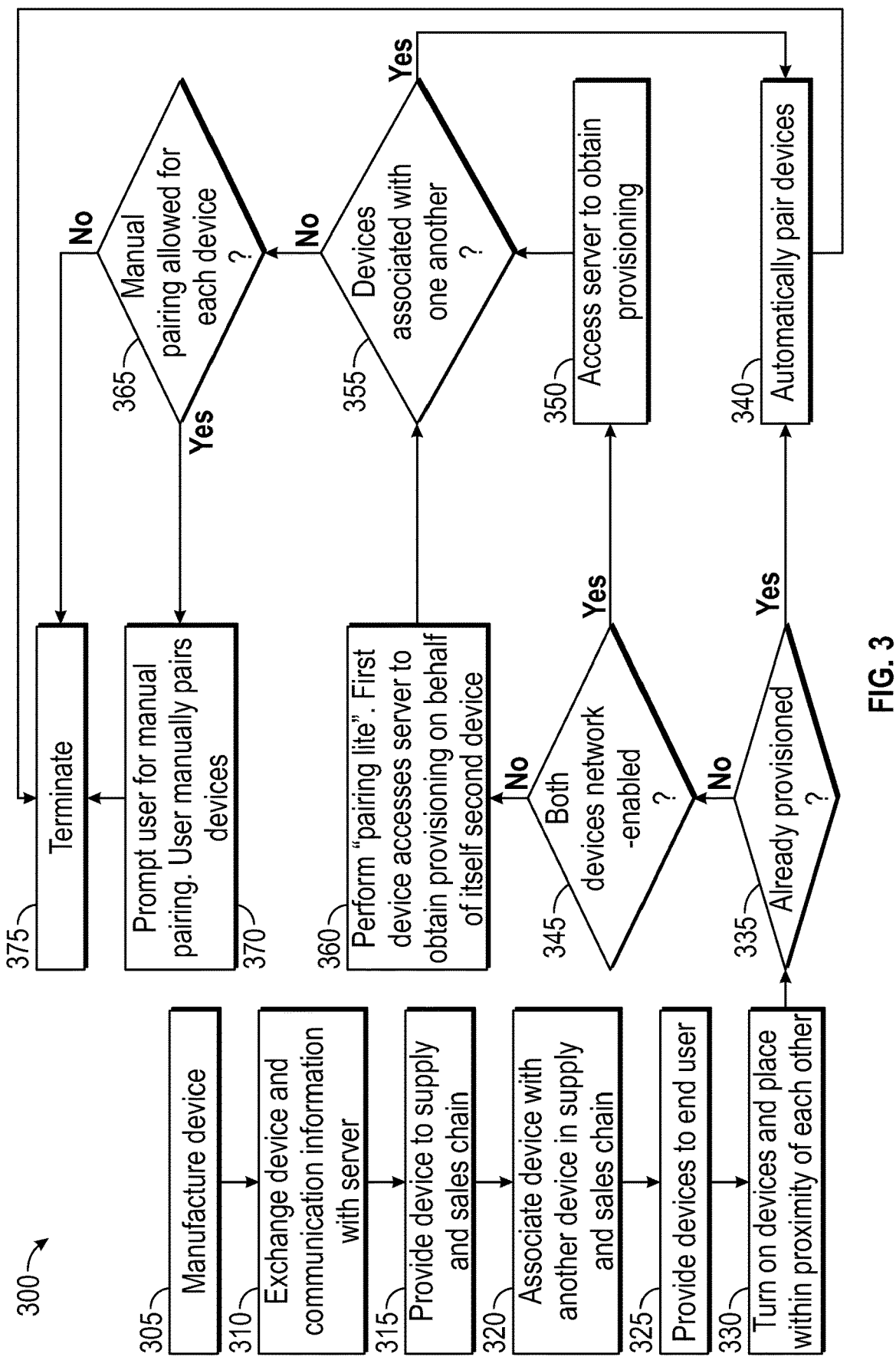
FIG. 3 is an illustration of an example method for out-of-the-box pairing for unassociated wireless devices, according to embodiments of the preset disclosure.

FIG. 3 is an illustration of an example method 300 for out-of-the-box pairing for unassociated wireless devices, according to embodiments of the preset disclosure. Method 300 may be performed by any suitable apparatus, such as the system 100 of FIG. 1 or the system 200 of FIG. 2. More specifically, method 300 may be performed by any suitable combination of devices 104, 106 and servers 102. Method 300 may begin at any suitable step such as step 305. Method 300 may include more or fewer steps than shown in FIG. 3. Method 300 may optionally repeat, omit, or perform steps in a different order as shown in FIG. 3 consistent with the teachings of the present disclosure. Method 300 may be performed recursively, and system 100 and system 200 may be configured to perform multiple instances of method 300 in parallel. Method 300 may be performed upon any suitable event, signal, or command, on demand by a user, periodically, or any other suitable criteria.

At 305, a device may be manufactured. The device may be assigned unique identifiers and model numbers.

At 310, information about the device, as well as communication information to be used for later provisioning, may be provided to a server. The server may be accessible later in method 300 and may include a cloud server. The information about the device may be a unique identifier, model number, or other suitable information. The communication information may include public or private keys of the server and the device.

At 315, the device may be provided to various entities within a supply chain, distribution network, or POS.

At 320, the device may be associated with one or more other devices for automatic pairing.

At 325, the device may be provided to an end user.

At 330, the device and another device may be powered on and placed within proximity to each other so as to facilitate wireless communication between the devices.

At 335, it may be determined whether the devices have already been provisioned with information indicating that the devices are to be automatically paired. If so, method 300 may proceed to 340. Otherwise, method 300 may proceed to 345.

At 340, the devices may be automatically paired with one another.

At 345, it may be determined whether both devices are network-enabled to access the cloud server to determine provisioning information. If so, method 300 may proceed to 350. Otherwise, method 300 may proceed to 365.

At 350, the cloud server may be accessed to determine provisioning information for the devices. The provisioning information may include an indication that the two devices are to be automatically paired with one another.

At 355, whether the devices are to be automatically paired with one another may be determined. If so, method 300 may proceed to 340. Otherwise, method 300 may proceed to 360.

At 360, "pairing lite" may be performed, wherein the devices communicate via a wireless connection but not according to the wireless standard protocol, as these devices are not fully paired. The communication may be limited to transmittal of identifying information of the non-network-enabled device so that the network-enabled device may access the cloud server on behalf of the non-network-enabled device. The first device, a network-enabled device, may access the server to obtain provisioning on behalf of itself, if necessary, and the second device, the non-network-enabled device. Method 300 may then proceed to 355 to determine whether the devices are associated with each other to be automatically paired.

At 365, a user may manually pair the devices. In one embodiment, whether to allow the user to manually pair the devices may be specifically enabled or disabled. Thus, at 360, it may be determined whether manual pairing is allowed for each device. The determination may be made according to any suitable setting or other information. Such a setting may be built into each device or may be provided by the server. If the devices may be manually paired, method 300 may proceed to 370. Otherwise, method 300 may proceed to step 375.

At 370, a user may be prompted to manually pair the devices. If the manual pairing process is completed, then the devices may be paired. Method 300 may proceed to 375.

At 375, method 300 may terminate, or may repeat in part or in full. For example, if other devices are turned on and within range of each other or of one of the previously discussed devices, method 300 may repeat at, for example, step 335.

Figure 4:
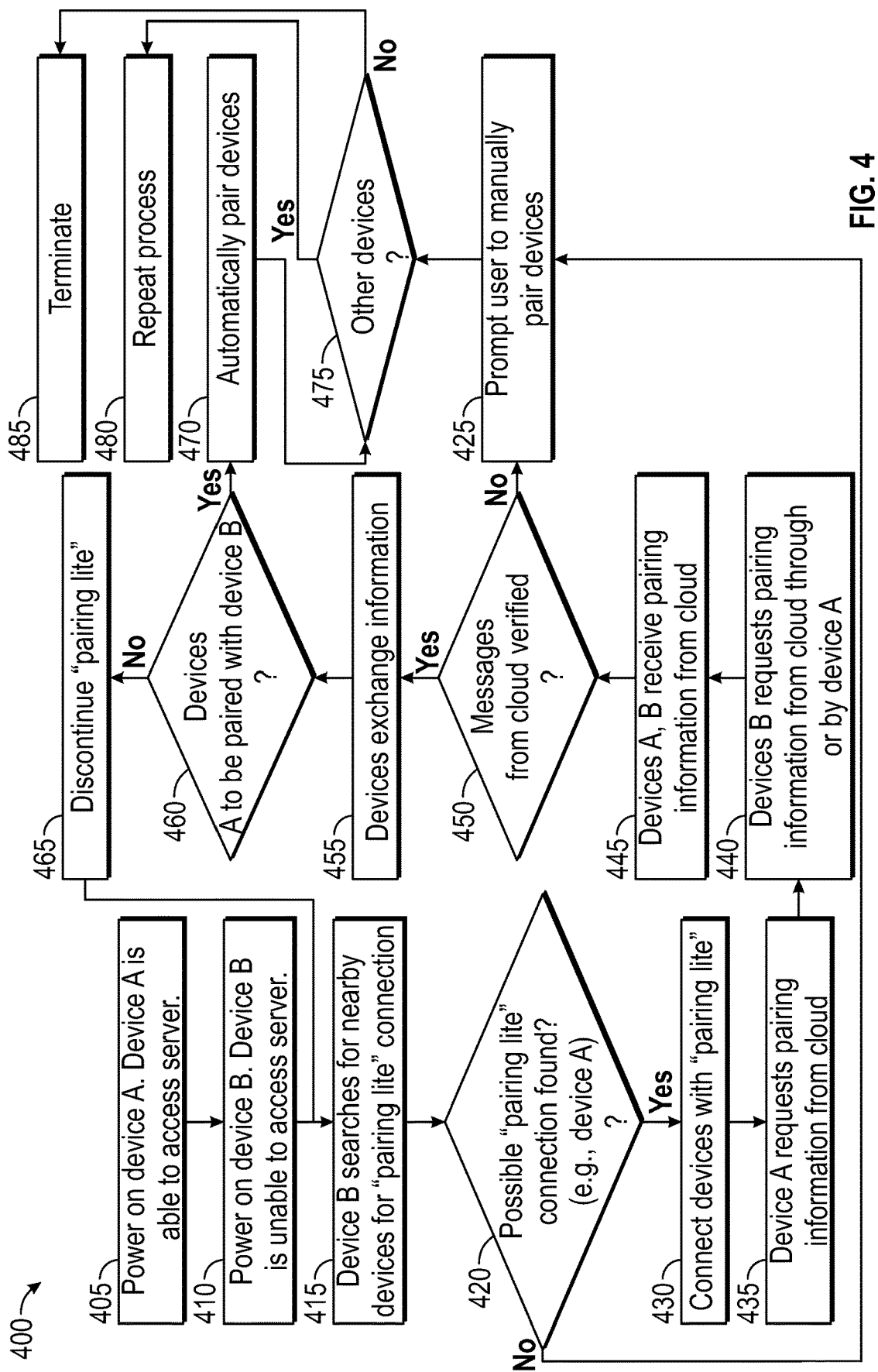
FIG. 4 is an illustration of further detailed example method for out-of-the-box pairing for unassociated wireless devices, according to embodiments of the preset disclosure.

FIG. 4 is an illustration of further detailed example method 400 for out-of-the-box pairing for unassociated wireless devices, according to embodiments of the preset disclosure. Method 400 may provide more detailed implementation of steps 330-360 of FIG. 3. Method 400 may be performed by any suitable apparatus, such as the system 100 of FIG. 1 or the system 200 of FIG. 2. More specifically, method 400 may be performed by any suitable combination of devices 104, 106 and servers 102. Method 400 may begin at any suitable step such as step 405. Method 400 may include more or fewer steps than shown in FIG. 4. Method 400 may optionally repeat, omit, or perform steps in a different order as shown in FIG. 4 consistent with the teachings of the present disclosure. Method 400 may be performed recursively, and system 100 and system 200 may be configured to perform multiple instances of method 400 in parallel. Method 400 may be performed upon any suitable event, signal, or command, on demand by a user, periodically, or any other suitable criteria.

At 405, a device A, such as device 104A, may be powered on. As discussed above, device A may be able to access cloud servers or other servers to determine whether it should be automatically paired with other devices. The ability to access the cloud server may be inherent to device A itself. For example, device A may be a phone connected via wireless technology or an ethernet cable to a network. The ability to access the cloud server may be based on a connection to a companion device, such as a dongle (device A) plugged into a computer that in turn can communicate over a network.

At 410, a device B, such as device 106A, may be powered on. As discussed above, in some cases device B might not be able to access cloud servers or other servers to determine whether it should be automatically paired with other devices. In other cases, device B might be able to access cloud servers or other servers to determine such information. In such cases, some steps of method 400 may be omitted or modified, such 440. Device A and device B may be placed within close proximity to each other, sufficient for wireless communication.

At 415, device B may search for any nearby devices with which it may be paired. If a device is nearby and the devices have already been paired, the devices may resume the previous pairing. Otherwise, device B may search for any nearby devices with which it may be connected using a "pairing lite" connection such that networking capabilities of the other device are used to access the servers. Device B may search for such nearby devices in any suitable manner. For example, given multiple such nearby devices, device B may prioritize potential pairing with these in any suitable order. For example, a nearest device (with the strongest signal) may be prioritized for evaluation of automatic pairing. In another example, devices that are more likely to be paired with device B are prioritized for evaluation of automatic pairing. This may be done on the basis of, for example, a model number of the other device, and a mapping of priority of such model numbers in device B. For example, if device B is a headset and is within range of a first device that is a phone and a second device that is a computer, device B may prioritize automatic pairing evaluation with the phone versus automatic pairing evaluation with the computer. While automatic pairing is feasible with either of these other devices, a more common use case may be pairing of device B with the phone.

Furthermore, as part of this step, device B may determine whether such nearby devices also support "pairing lite" connections. In addition, as this step may be repeated for multiple such devices within range of device B, device B may remember or store previous failed attempts at or evaluations of automatic pairing. Device B may then subsequently attempt automatic pairing with other devices. Device B may determine that the other device is capable of "pairing lite" connections through any suitable process. For example, the devices may perform a handshake, query, or other exchange of information to confirm that the "pairing lite" connection is possible. The information may include or be based upon, for example, model numbers or a shared secret.

At 420, it may be determined whether any such "pairing lite" possible connections are found, such as with device A. If such a connection is found, method 400 may proceed to 430. Otherwise, method 400 may proceed to 425.

At 425, a user of device B may be prompted to manually pair the devices. The user may also be prompted to powering off device B to attempt the automatic process again, or to proceed to other devices as discussed in 475. Method 400 may proceed to 475.

At 430, the devices may be connected using a "pairing lite" connection, wherein the devices communicate via a wireless connection but are not yet fully paired, and only sufficient information to verify whether automatic pairing should occur is exchanged. Device A may ensure that device B is attempting a legitimate connection to a same cloud server, rather than simply using the network connection of device A.

At 435, device A may request pairing information from the cloud server.

At 440, device B may request pairing information from the cloud server through or by device A. If device B is able to directly request information from the cloud server, device B may make such a direct request without going through device A.

At 445, devices A and B may receive pairing information, if available, from the cloud server.

At 450, the messages from the cloud server may be verified. Such verification may include authenticating that the messages were originally provided by the cloud server. The verification may further include determining that pairing information is available. If the messages from the cloud are not verified, meaning that the cloud server was not authenticated, or that the messages indicate that pairing information is not available, for device A or for device B, method 400 may proceed to 425. Otherwise, method 400 may proceed to 455. Furthermore, if the messages from the cloud server are compromised, or if the other device is to not be paired with the device, the other device may be blacklisted from further attempts at automatic pairing.

At 455, the information from the cloud server may be exchanged between device A and device B.

At 460, it may be determined whether device A and device B are to be automatically paired, based on the information from the cloud server, which is in turn based upon a previous association of device A and device B in the cloud server. For example, the cloud server may define that device A may be able to be paired with any of device B, a device C, or a device D. Thus, device A may subsequently automatically pair with device B. However, device A would not automatically pair with, for example, a device E. If the devices are to be automatically paired, method 400 may proceed to 470. Otherwise, method 400 may proceed to 465.

At 465, the "pairing lite" connection may be discontinued. Method 400 may proceed to 415 so that device B (or, in other examples, device A) may continue to search for devices with which to automatically pair.

At 470, the devices may be automatically paired. The pairing may be reported to the cloud server.

At 475, it may be determined whether there are other devices within a sufficient proximity to communicate with using wireless. If so, at 480 method 400 may repeat, completely or in part, with regards to these other devices and device A or device B. Otherwise, at 485, method 400 may terminate.

Some or all of method 400 may be repeated on, for example, a periodic basis, wherein device A periodically polls the cloud server to determine if there are additional devices that are to be automatically paired with. If so, method 400 may be performed after searching for any such additional devices within range. In another example, the devices may perform periodic polling for additional devices within range and, if they are found, method 400 may be performed.

Figure 5:
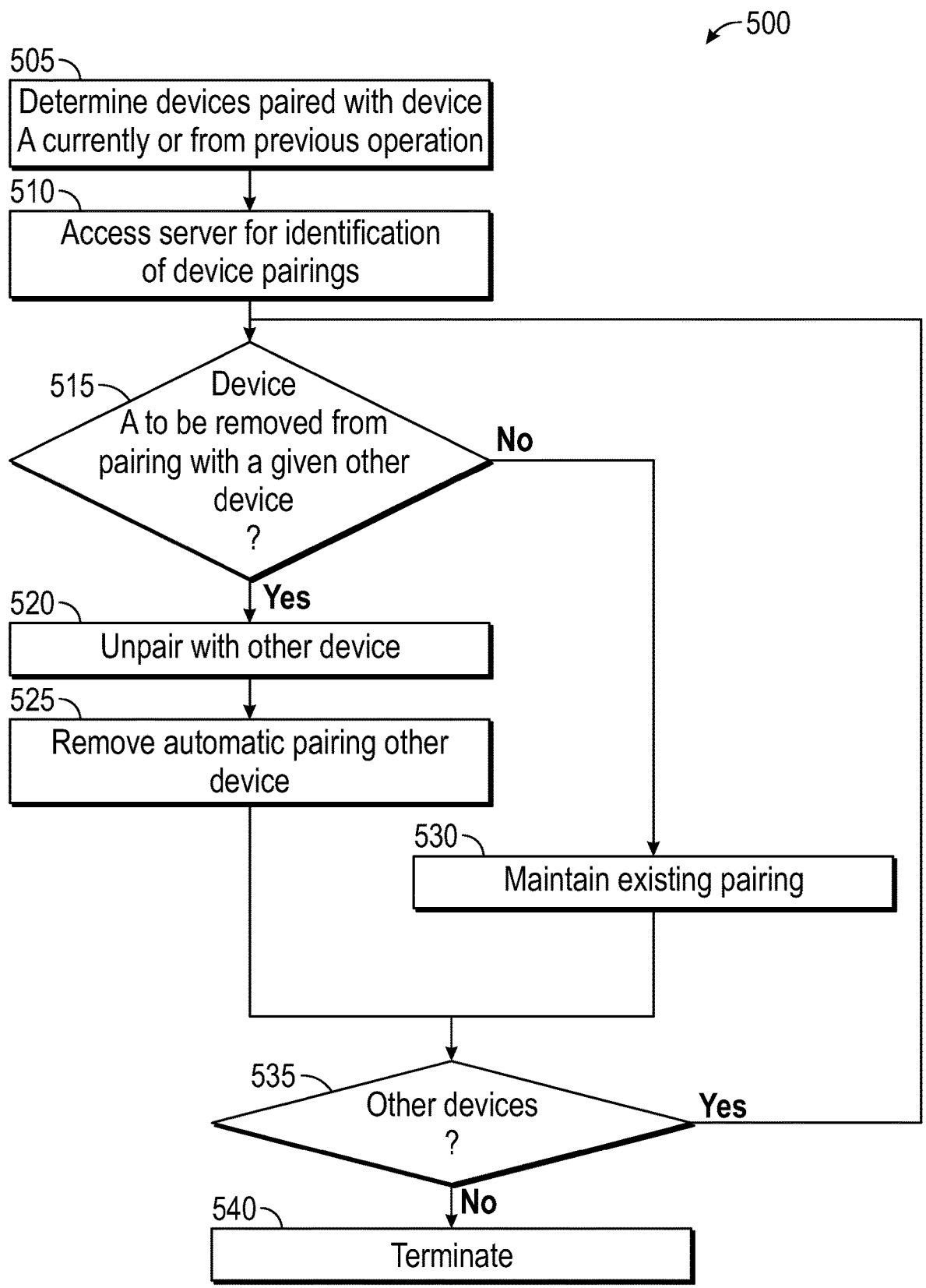
FIG. 5 is an illustration of an example method for removing pairings of associated devices, according to embodiments of the preset disclosure.

FIG. 5 is an illustration of an example method 500 for removing pairings of associated devices, according to embodiments of the preset disclosure. Method 500 may be performed in addition to or as part of any suitable portion of methods 300, 400. For example, after pairing two devices in method 300 or method 400, method 500 may be performed for the two devices. Method 500 may be performed by any suitable apparatus, such as the system 100 of FIG. 1 or the system 200 of FIG. 2. More specifically, method 500 may be performed by any suitable combination of devices 104, 106 and servers 102. Method 500 may begin at any suitable step such as step 505. Method 500 may include more or fewer steps than shown in FIG. 5. Method 500 may optionally repeat, omit, or perform steps in a different order as shown in FIG. 5 consistent with the teachings of the present disclosure. Method 500 may be performed recursively, and system 100 and system 200 may be configured to perform multiple instances of method 500 in parallel. Method 500 may be performed upon any suitable event, signal, or command, on demand by a user, periodically, or any other suitable criteria.

As discussed above, users or various elements of system 100 or system 200 may specify that a given pair of devices are to be automatically paired. Furthermore, any such users or various elements of system 100 or system 200 may specify that a given pair of devices are not to be automatically paired. This may include a reversal of a previous setting.

At 505, it may be determined, for a given device A, what other devices are currently paired with device A. Moreover, it may be determined what other devices have been previously paired with device A from previous pairing operations. These other devices may include devices that were defined to be automatically paired with device A.

At 510, a server may be accessed for an identification of device pairings. This identification may include a definition that device A and given other devices are not to be paired automatically. This may be included with other definitions of automatic pairings between devices.

At 515, it may be determined, for a given other device within wireless range of device A, or for a given other device that was previously paired or automatically paired with device A, whether device A is to be removed from automatic pairing with the given device. If so, method 500 may proceed to 520. Otherwise, method 500 may proceed to 530.

At 520, device A may be unpaired with the given device if it is presently paired.

At 525, future automatic pairing between device A and the given device may be disabled or removed. Method 500 may proceed to 535.

At 530, existing pairing may be maintained.

At 535, it may be determined if there are other devices that are currently paired with device A or previously paired with device A that have not been evaluated with the identifications determining in step 510. If so, method 500 may return to 515 for evaluation of another such device. Otherwise, method 500 may proceed to 540, wherein method 500 may terminate.

Those in the art will understand that a number of variations may be made in the disclosed embodiments, all without departing from the spirit and scope of the invention, which is defined solely by the appended claims.

What is claimed is:

1. An apparatus, comprising:
   a network circuit configured to:
      communicatively couple the apparatus to a network and a server on the network;
   a wireless circuit configured to:
      communicatively couple the apparatus to a wireless device, wherein the apparatus and the wireless device are to exchange application data after being paired; and
   control logic configured to:
      determine whether or not the wireless device is within a given proximity of the apparatus;
      determine whether or not the wireless device is configured to perform an automatic pairing;
      access, when the control logic determines that the wireless device is within the given proximity of the apparatus and is configured to perform automatic pairing, the server to determine whether to perform the automatic pairing with the wireless device;
      pair, when the control logic determines that the automatic pairing is to be performed with the wireless device, the apparatus with the wireless device without further input from a user of the apparatus; and
      remove, when the control logic determines that the automatic pairing is not to be performed with the wireless device, pairing of the apparatus with the wireless device and prevent future automatic pairing of the apparatus with the wireless device.

2. The apparatus of claim 1, wherein the determination of whether to perform automatic pairing with the wireless device is based upon a prior association of the apparatus and the wireless device.

3. The apparatus of claim 2, wherein the prior association of the apparatus and the wireless device are based upon a mapping of unique identifiers of the apparatus and the wireless device.

4. The apparatus of claim 1, wherein the control logic is further configured to:
   access the server to determine whether to perform automatic pairing with the wireless device on behalf of the wireless device; and
   provide a response from the server to the wireless device regarding whether automatic pairing is to be performed with the apparatus.

5. The apparatus of claim 1, wherein the control logic is further configured to, based on a determination that automatic pairing is not to be performed with the wireless device, prompt a user of the apparatus to manually pair the wireless device with the apparatus.

6. The apparatus of claim 1, wherein the determination of whether the wireless device is configured to perform automatic pairing includes an exchange of information with the wireless device, the information to identify whether the wireless device is configured to perform automatic pairing.

7. The apparatus of claim 6, wherein the exchange of information to identify whether the wireless device is configured to perform automatic pairing is made during a Bluetooth pairing request.

8. The apparatus of claim 1, wherein the control logic is further configured to, based on a determination that automatic pairing is not to be performed with the wireless device:
   determine whether manual pairing is allowed between the apparatus and the wireless device; and
   based on a determination of whether manual pairing is allowed between the apparatus and the wireless device and that automatic pairing is not to be performed with the wireless device, allow or deny a user to manually pair the wireless device with the apparatus.

9. A method, comprising:
   communicatively coupling, by network circuit, an apparatus to a network and a server on the network;
   communicatively coupling, by a wireless circuit, the apparatus to a wireless device, wherein the apparatus and the wireless device are to exchange application data after being paired;
   determining, by control logic, whether or not the wireless device is within a given proximity of the apparatus;
   determining, by the control logic, whether or not the wireless device is configured to perform automatic pairing;
   based on a determination that the wireless device is within the given proximity of the apparatus and is configured to perform automatic pairing, accessing the server to determine whether to perform automatic pairing with the wireless device;
   based on a determination that automatic pairing is to be performed with the wireless device, pairing with the wireless device without further input from a user of the apparatus; and
   based on a determination that automatic pairing is not to be performed with the wireless device, removing pairing with the wireless device and preventing future automatic pairing with the wireless device.

10. The method of claim 9, further comprising determining whether to perform automatic pairing with the wireless device based upon a prior association of the apparatus and the wireless device.

11. The method of claim 10, wherein the prior association of the apparatus and the wireless device are based upon a mapping of unique identifiers of the apparatus and the wireless device.

12. The method of claim 9, further comprising:
   accessing the server to determine whether to perform automatic pairing with the wireless device on behalf of the wireless device; and
   providing a response from the server to the wireless device regarding whether automatic pairing is to be performed with the apparatus.

13. The method of claim 9, further comprising, based on a determination that automatic pairing is not to be performed with the wireless device, prompting a user of the apparatus to manually pair the wireless device with the apparatus.

14. The method of claim 9, wherein determining whether the wireless device is configured to perform automatic pairing includes an exchange of information with the wireless device, the information to identify whether the wireless device is configured to perform automatic pairing.

15. The method of claim 14, wherein the exchange of information to identify whether the wireless device is configured to perform automatic pairing is made during a Bluetooth pairing request.

16. The method of claim 9, further comprising, based on a determination that automatic pairing is not to be performed with the wireless device:
   determining whether manual pairing is allowed between the apparatus and the wireless device; and
   based on a determination of whether manual pairing is allowed between the apparatus and the wireless device and that automatic pairing is not to be performed with the wireless device, allowing or denying a user to manually pair the wireless device with the apparatus.

* * * * *